G. W. DELLINGER.
Middlings-Purifiers.

No. 154,379. — Patented Aug. 25, 1874.

WITNESSES:
E. Wolff
O. Sedgwick

INVENTOR:
G. W. Dellinger
BY
ATTORNEYS.

UNITED STATES PATENT OFFICE.

GEORGE W. DELLINGER, OF RIPON, WISCONSIN.

IMPROVEMENT IN MIDDLINGS-PURIFIERS.

Specification forming part of Letters Patent No. 154,379, dated August 25, 1874; application filed June 20, 1874.

*To all whom it may concern:*

Be it known that I, GEORGE W. DELLINGER, of Ripon, in the county of Fond du Lac and State of Wisconsin, have invented a new and Improved Middlings-Purifier, of which the following is a specification:

My invention consists of a series of horizontal circular sieves, one above another, on a hollow shaft, with a hopper or funnel below each sieve, a discharge-gutter at the periphery, and a fan-blower connected with the lower end of the hollow shaft, all so contrived that the air blows up through the sieves from below, and, together with the centrifugal action of the sieves, which have an oscillating motion, causes the light matters to pass off over the edges of the sieves to the gutter, while the heavier matters passing through the sieves are conducted by the hopper to the center of the next sieve below, in a manner calculated to be very efficient in separating the impure matters from those suitable for regrinding.

Figure 1:
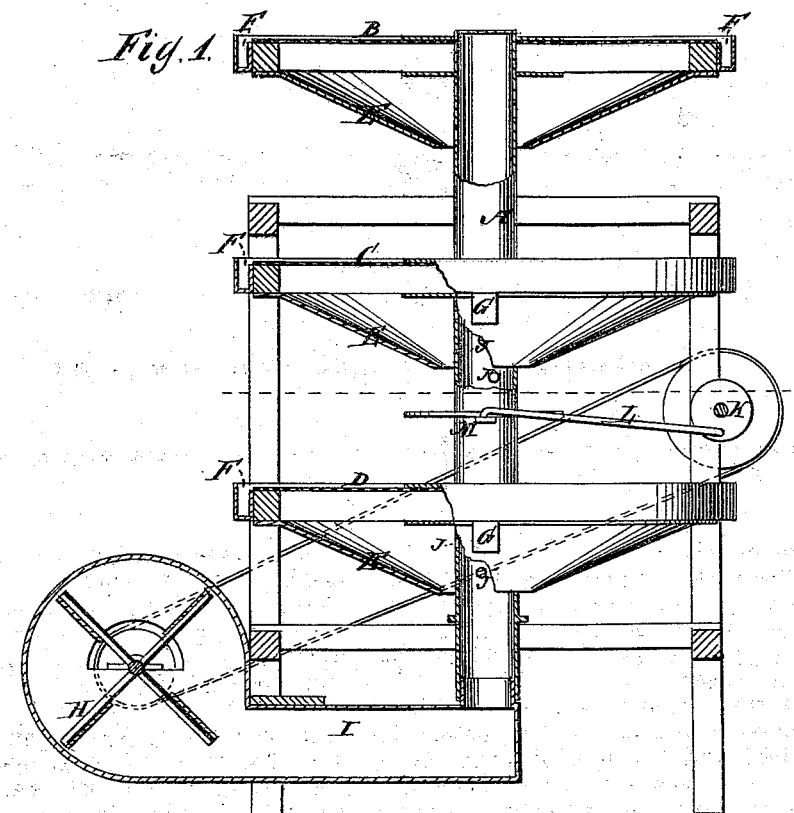
Figure 2:
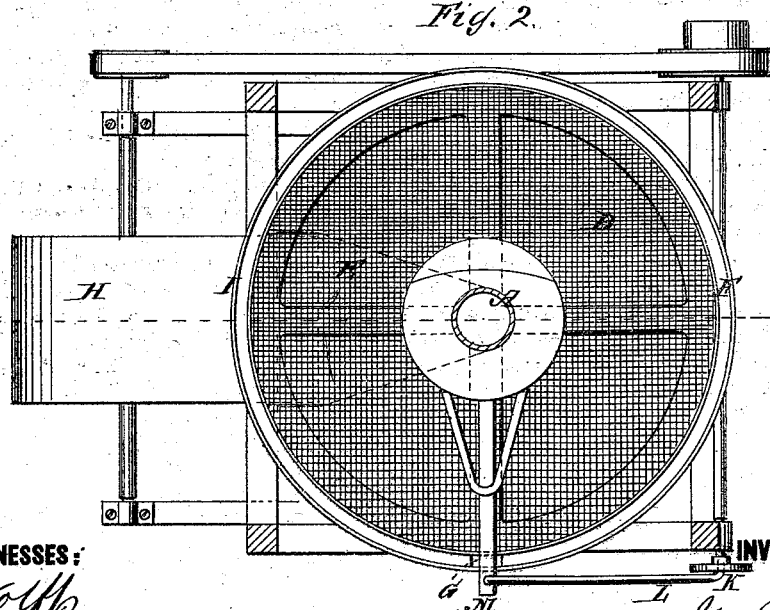

Figure 1 is a sectional elevation of my improved middlings-purifier, taken on the line $x\,x$ of Fig. 2; and Fig. 2 is a horizontal section taken on the line $y\,y$ of Fig. 1.

Similar letters of reference indicate corresponding parts.

A represents the hollow vertical shaft; B, C, and D, three horizontal cloth sieves, arranged at suitable distances apart on said shaft, one above another; E, a hopper or funnel under each sieve to receive the matters falling through and discharge them on the center of the next sieve below; F, a gutter at the outer edge of each sieve to receive the light matters and conduct them to the discharge-spouts G; H, a fan for blowing air into the shaft through spout I and up through the sieves, the air passing out of the shaft at the holes J between the hoppers and the sieves. K is a crank-shaft. L is a connecting-rod, and M an arm on the shaft for imparting oscillating motion to the sieve.

Fine wire-cloth may be used for the sieves, if necessary.

Having thus described my invention, I claim as new and desire to secure by Letters Patent—

One or more horizontal oscillating sieves on a hollow perforated vertical shaft, one or more funnels, E, and a fan-blower, combined and arranged substantially as specified.

GEORGE W. DELLINGER.

Witnesses:
L. E. REED.
W. W. DAVY.